(12) United States Patent
Cullum et al.

(10) Patent No.: US 8,360,710 B2
(45) Date of Patent: Jan. 29, 2013

(54) TILTABLE LOADING SYSTEM AND EXTENDABLE PLATFORM FOR TRANSFERRING CARGO

(75) Inventors: John M Cullum, Chattanooga, TN (US); David W Bannon, Chattanooga, TN (US); Dean T Mullin, New Maryland (CA); Christopher L Wilcox, Federicton (CA)

(73) Assignee: Miller Industries Towing Equipment Inc, Ooltewah, TN (US)

( * ) Notice: Subject to any disclaimer, the term of this patent is extended or adjusted under 35 U.S.C. 154(b) by 163 days.

(21) Appl. No.: 13/013,975

(22) Filed: Jan. 26, 2011

(65) Prior Publication Data
US 2011/0135439 A1 Jun. 9, 2011

Related U.S. Application Data

(62) Division of application No. 11/470,351, filed on Sep. 6, 2006, now Pat. No. 7,901,174.

(51) Int. Cl.
*B60P 1/04* (2006.01)
(52) U.S. Cl. ......... 414/812; 414/478; 414/494; 414/500
(58) Field of Classification Search ............... 244/118.1, 244/137.1; 414/346, 435, 469, 471, 477–480, 414/482, 491, 494, 500, 589, 812
See application file for complete search history.

(56) References Cited

U.S. PATENT DOCUMENTS

| | | | | |
|---|---|---|---|---|
| 2,786,590 | A * | 3/1957 | Edwards et al. | 414/477 |
| 3,485,400 | A * | 12/1969 | Pewthers | 414/477 |
| 4,400,130 | A * | 8/1983 | Anttila et al. | 414/478 |
| 5,405,233 | A * | 4/1995 | Cordell | 414/389 |
| 5,662,453 | A * | 9/1997 | Gerstner et al. | 414/812 |
| 5,967,733 | A * | 10/1999 | Cash | 414/483 |
| 8,006,935 | B2 * | 8/2011 | Wells et al. | 244/137.1 |
| 2004/0179927 | A1 * | 9/2004 | Georges | 414/491 |

* cited by examiner

*Primary Examiner* — James Keenan
(74) *Attorney, Agent, or Firm* — Michael P. Mazza, LLC

(57) ABSTRACT

A device and method for transferring cargo are disclosed, including transferring cargo between an aft-loading aircraft and a ground transportation vehicle. In one embodiment, the invention may include a tilt frame, a transfer bed, and an adjustable carriage. The tilt frame may be pivotally engaged to a vehicle chassis where the tilt frame has a first end near the cab of the vehicle and a second end distal from the cab. The transfer bed may have a first end connected to the tilt frame and may be movable along an upper surface of the tilt frame. The adjustable height carriage may support a second end of the transfer bed. The transfer bed may be leveled at varying heights by moving the first end of the transfer bed along the upper surface of the tilt frame, and by varying the height of the carriage.

9 Claims, 17 Drawing Sheets

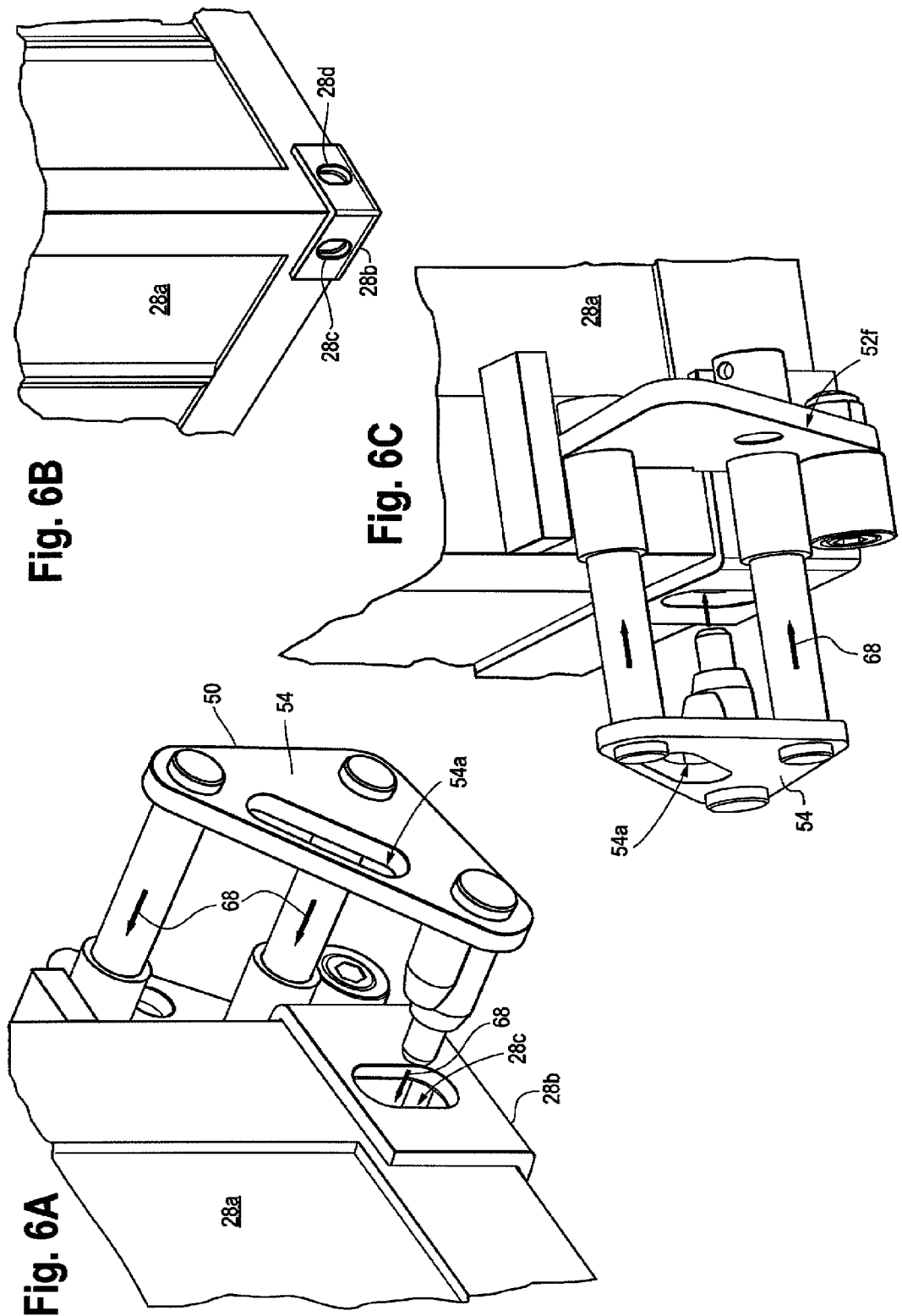

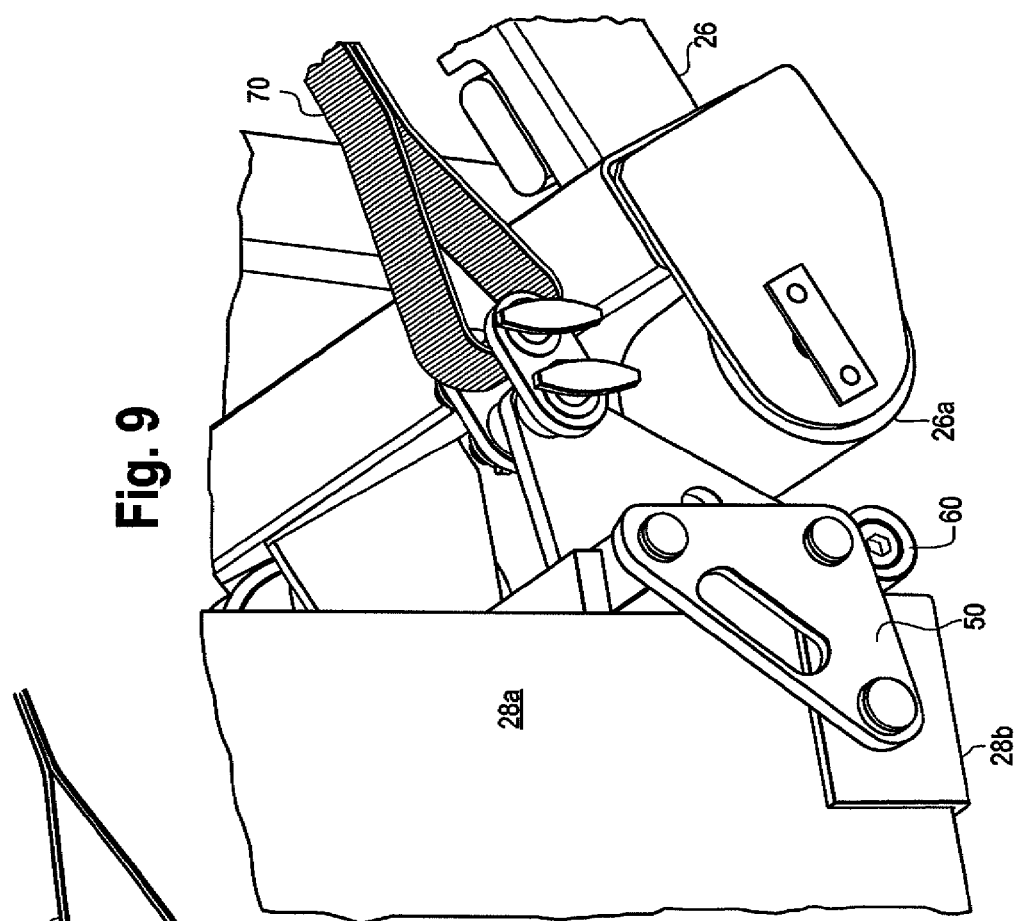
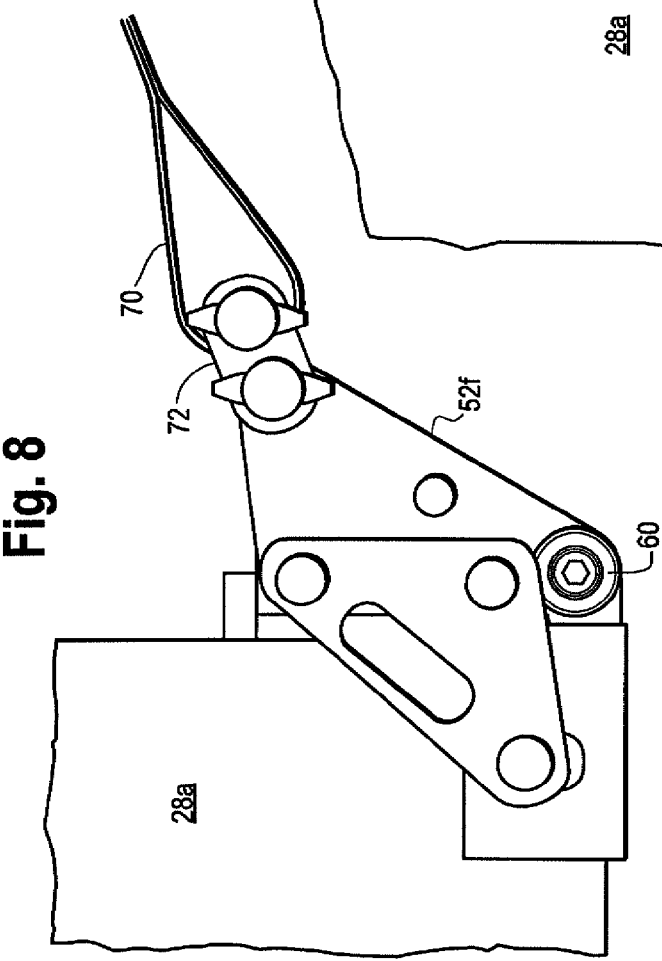
Fig. 8
Fig. 9

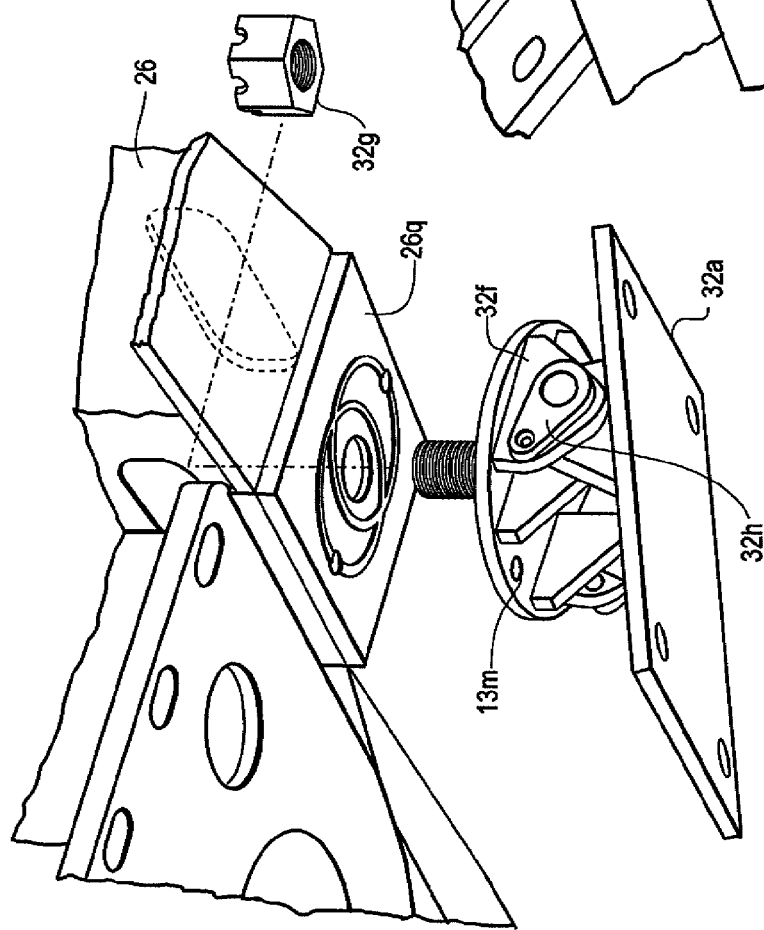
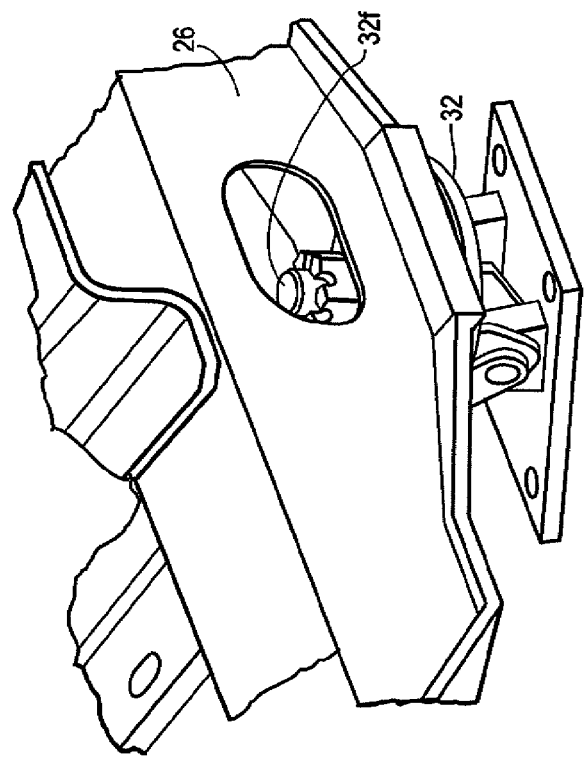
Fig. 13A
Fig. 13B

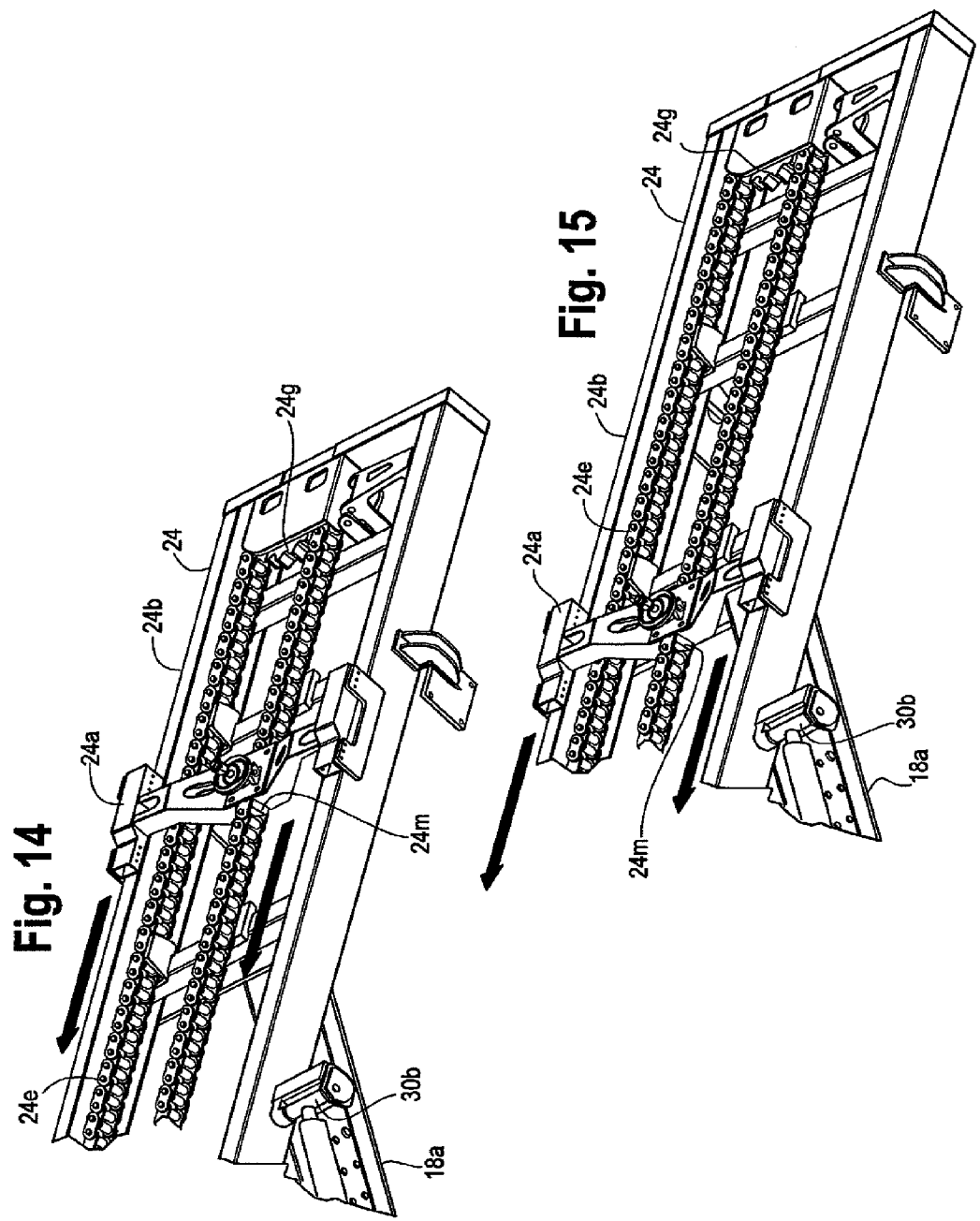

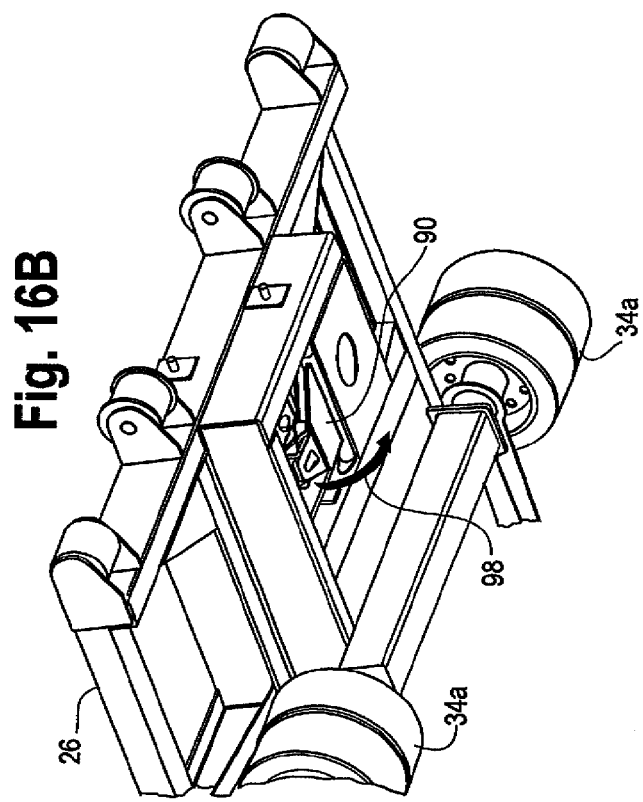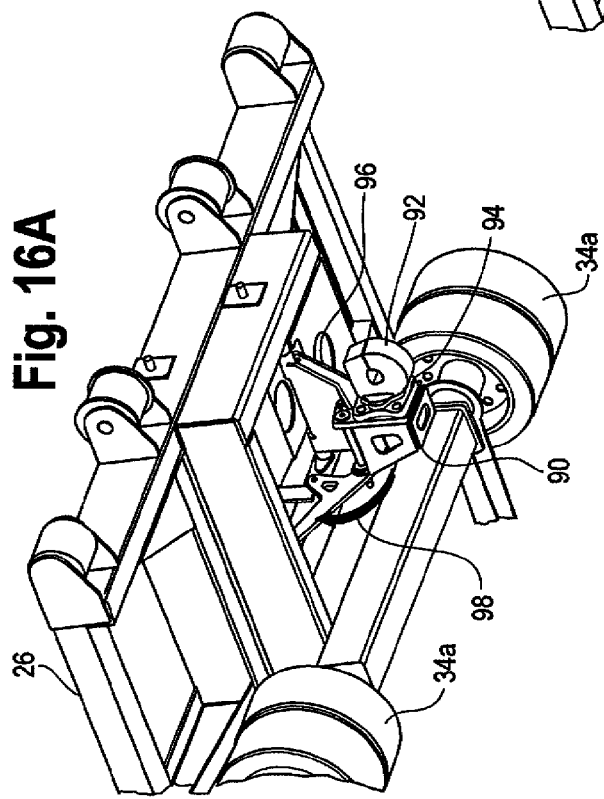

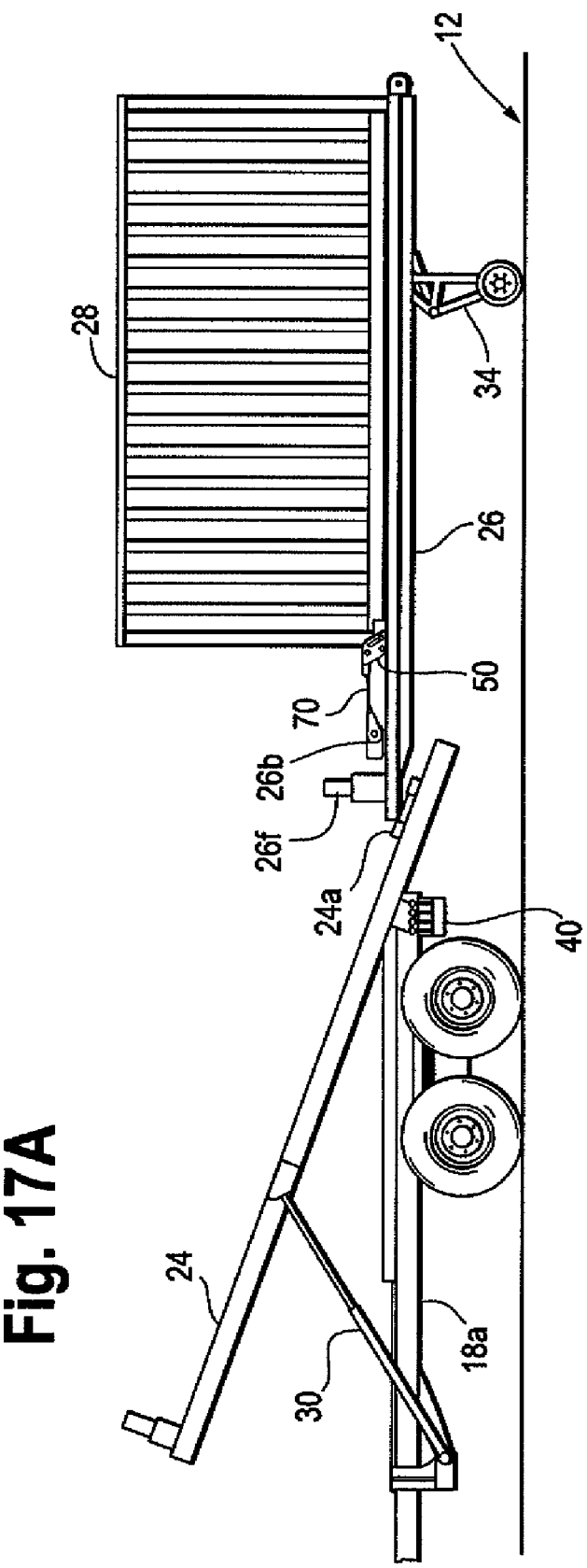

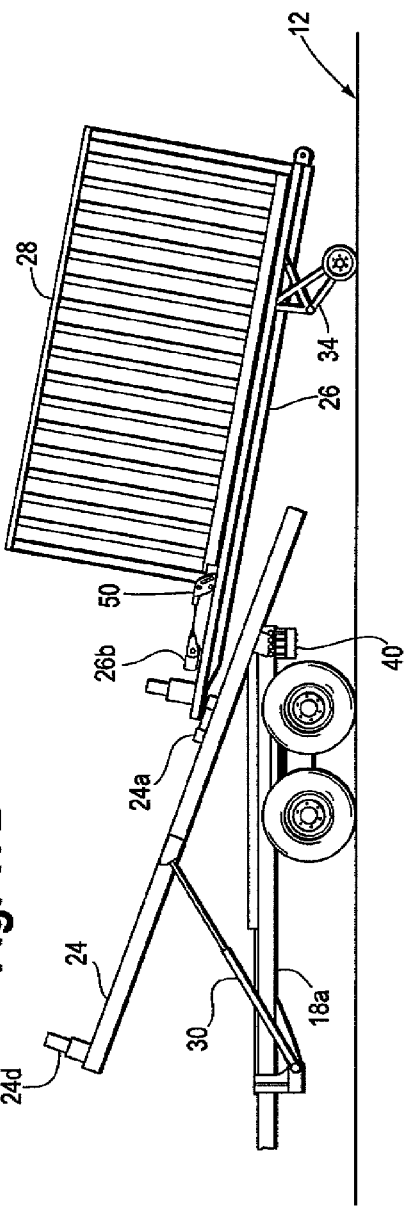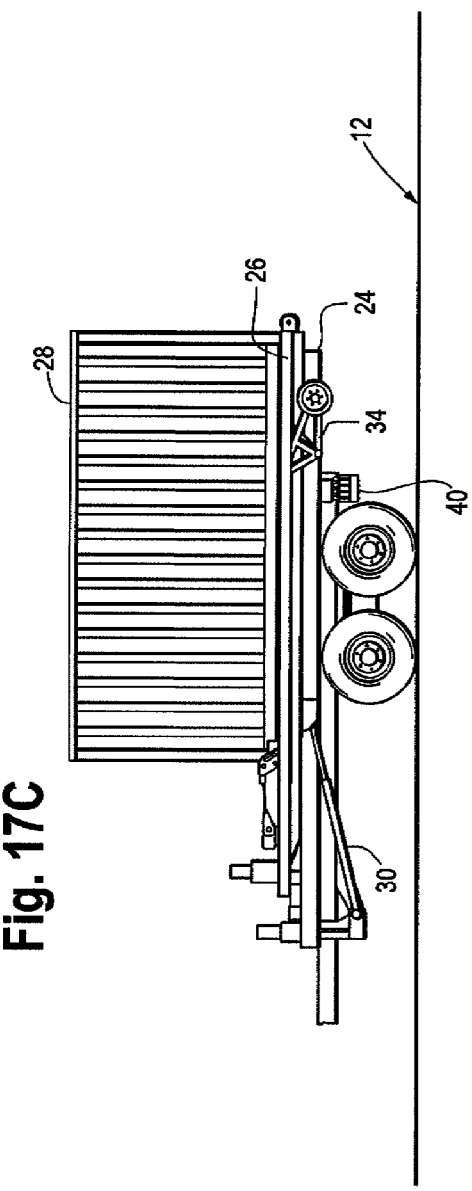

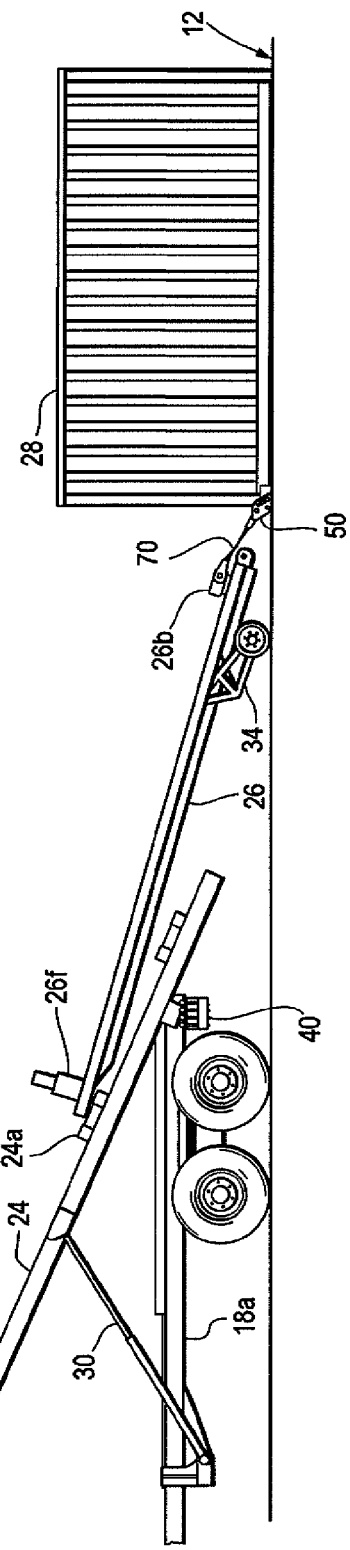
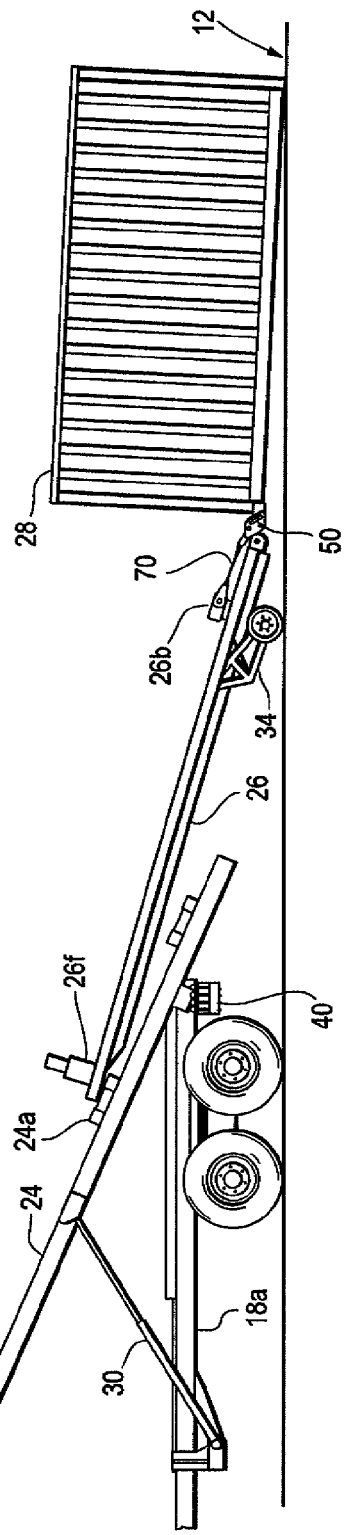

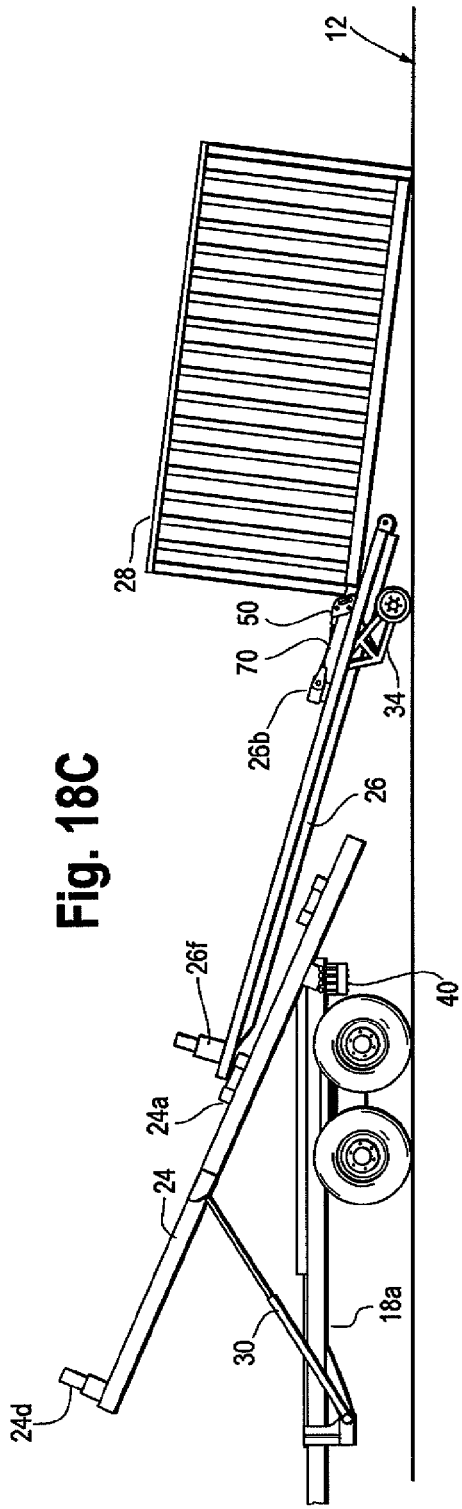
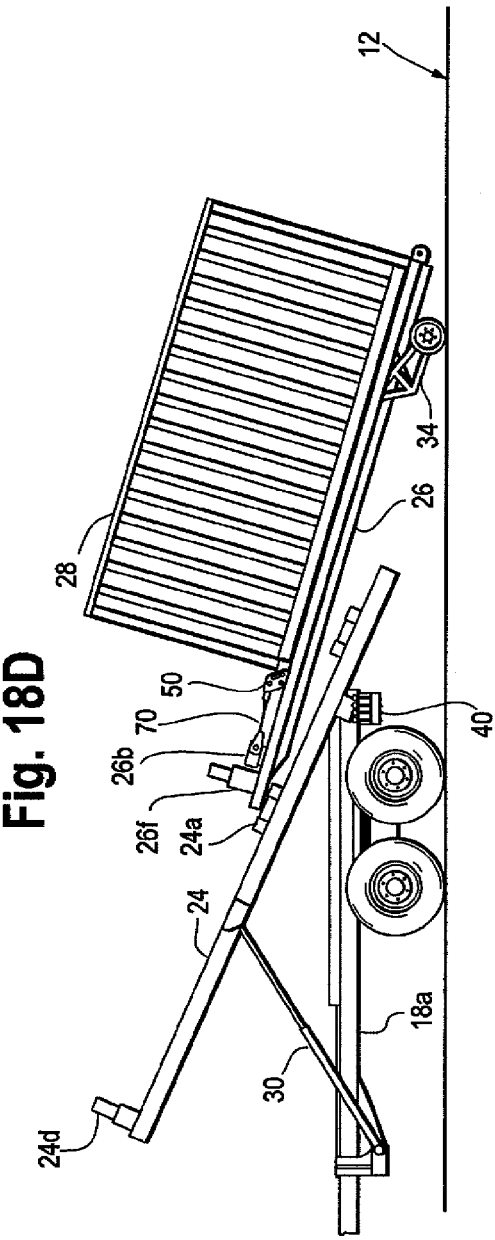

TILTABLE LOADING SYSTEM AND EXTENDABLE PLATFORM FOR TRANSFERRING CARGO

This application is a divisional of prior application Ser. No. 11/470,351 filed on Sep. 6, 2006, now U.S. Pat. No. 7,901,174 ("the Parent Case").

BACKGROUND OF THE INVENTION

The present invention generally relates to an apparatus and method for transferring cargo, including transferring cargo between an aircraft and a ground transportation vehicle. The invention allows for the transferring of cargo in a number of scenarios and environments, including accounting for spatial restraints imposed by the structure of aft-loading aircraft Cargo transferring systems are known for transferring aircraft cargo, such as containers, equipment and vehicles, to and from ground transportation vehicles, such as trucks and trailers. Two such transferring systems are available from Stewart & Stevenson of Sealy, Texas, and are known as the Family of Medium Tactical Vehicles (FMTV) Loading Handling System and the Medium Tactical Truck Demonstrator (MTTD). These transferring systems employ L-arm hoist assemblies and/or overhead booms which require a substantial amount of overhead clearance, rendering them unsuitable for transferring aircraft cargo given the confining spatial envelope caused by the presence of the aircraft, and the elevated aircraft loading ramp. Such cargo transferring systems may also employ beds which may not load evenly with the aircraft loading ramp.

Accordingly, it would be advantageous to provide a transferring apparatus and method for quickly and efficiently transferring aircraft cargo within the spatial constraints caused by the presence of the aircraft and/or an elevated aircraft loading ramp.

SUMMARY OF THE INVENTION

The present invention may be used to transfer cargo, including transferring cargo between an aft-loading aircraft and a ground transportation vehicle, while operating within the spatial envelope of the aircraft and an elevated loading ramp. This is generally accomplished by securing and moving the cargo in a manner that allows for generally horizontal movement of the cargo as it is transferred within the spatial envelope.

A preferred embodiment of the invention includes a tilt frame, a transfer bed, and an adjustable height carriage. The tilt frame is pivotally engaged to a vehicle chassis, and has a first end near the cab of the vehicle and a second end distal from the cab. The transfer bed has a first end movable along the upper surface of the tilt frame. The adjustable height carriage supports the second end of the transfer bed. The transfer bed may be leveled at varying heights by varying at least one: the height of the carriage; and the height of the first end of the transfer bed by moving it along the upper surface of the tilt frame.

In another preferred embodiment, the invention includes a pivoting tilt frame and a transfer bed. The pivoting tilt frame is supported by the vehicle chassis. The transfer bed is pivotally connected at a first end to the tilt frame, and has a second end in engaged communication with a loading dock of an aircraft. The invention allows the cargo from the aircraft to be received by the transfer bed, and also allows the cargo to be transported from the transfer bed into the aircraft. The transfer bed includes an upper surface on which the cargo rests, and the upper surface of the transfer bed is capable of selective height adjustment relative to the ground.

One method of practicing the invention includes the steps of (A) pivotally raising a first end of a tilt frame engaged to the vehicle chassis, (B) leveling a transfer bed by at least one of: (i) moving a first end of the transfer bed along an upper surface of the tilt frame; and (ii) adjusting the height of a carriage supporting the second end of the transfer bed until the transfer bed is level; (C) pulling the cargo onto a second end of the transfer bed; (D) pulling the transfer bed onto the tilt frame; and (E) lowering the tilt frame.

Other systems, methods, features, and advantages of the present invention will be, or will become, apparent to one having ordinary skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIG. 6A is a first perspective view of the RACI of FIG. 5 showing the open RACI positioned over one side of the corner fitting of a shipping container;

FIG. 6B is a perspective view of another side of the corner fitting of a shipping container, FIG. 6C is a second perspective view of the RACI of FIG. 5 showing the open RACI over the corner fitting of the shipping container;

FIG. 8 is a side view of the closed RACI of FIG. 5, illustrating the attachment of a bracket and a strap;

FIG. 9 is a first perspective view of the RACI of FIG. 5, shown during the loading of the shipping container onto the transfer bed of FIGS. 1-4;

FIG. 13A is an exploded bottom perspective view of the meshing wheel of FIGS. 11 and 12 illustrating the connection to the transfer bed of FIG. 3;

FIG. 13B is a top perspective view of the meshing wheel of FIGS. 11 and 12 illustrating the connection to the transfer bed of FIG. 3;

FIG. 14 is a perspective view of the lilt frame and trolley of FIG. 12 in a first position on the tilt frame of FIGS. 1-4;

FIG. 15 is a perspective view of the tilt frame and trolley of FIG. 12 in a second position on the tile frame of FIGS. 1-4;

FIGS. 16A and 16B are bottom perspective views of a retractable pintle device associated with the transfer bed of FIGS. 1-4;

FIGS. 17A-17C are sequential side views illustrating how cargo may be transferred from an aircraft, as shown in FIG. 2, to the chassis of a vehicle; and FIGS. 18A-18D are sequential side views illustrating how cargo may be transferred front the ground to the transfer bed of FIGS. 3 and 4.

The components in the drawings are not necessarily to scale, emphasis instead being placed upon clearly illustrating the principles of the present invention. In the drawings, like reference numerals designate corresponding parts throughout the several views.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

In the claims, the "tilt frame" is any structure capable of supporting cargo loaded on a transfer bed, and that pivots on a vehicle chassis.

In the claims, "transfer bed" is any structure capable of height adjustment that supports cargo being transferred from a loading ramp or dock, and that may at least partially overlie and be supported by a tilt frame.

In the claims, "spatial envelope" refers to the area surrounding and adjacent to the loading ramp of an aircraft and beneath its tail.

DETAILED DESCRIPTION OF THE PREFERRED EMBODIMENTS

Set forth below is a description of what are believed to be the preferred embodiments and/or best examples of the invention claimed. Future and present alternatives and modifications to the preferred embodiments are contemplated. Any alternatives or modifications which make insubstantial changes in function, in purpose, in structure, or in result are intended to be covered by the claims of this patent.

The present invention generally relates to an apparatus and method for transferring cargo. The invention allows for the transfer of cargo in a number of scenarios and environments. Applications for the invention include transferring cargo between an aircraft and a ground transportation vehicle, and from the ground to the ground transportation vehicle. The invention provides for accomplishing such tasks within the spatial constraints imposed by military aircraft. For example, central-body loading military aircraft, such as the C-17 and C-130, provide problematic spatial constraints associated with an aft-loading ramp beneath the tail portion of the aircraft. The present invention addresses the problems associated with the prior art L-arm hoist assemblies and/or overhead booms which have been found to undesirably conflict with the spatial constraints associated with aircraft such as the C-17 and C-130.

Preferred embodiments of the present invention are provided below in which the cargo is transferred to and from the aircraft in a more horizontal manner. These new methods and systems for transferring cargo may use a number of new devices and steps, such as but not limited to: (1) a new device and method for engaging the cargo (see the RACI description and FIGS. 5-10); (2) a new device and method for transferring the cargo between the aircraft and ground transportation vehicle, including a tilt frame and retractable transfer bed; (3) a new device and method for leveling the transfer bed; and (4) a new device and method for engaging and moving the transfer bed in relationship to the chassis of the ground transportation vehicle.

Figure 3:
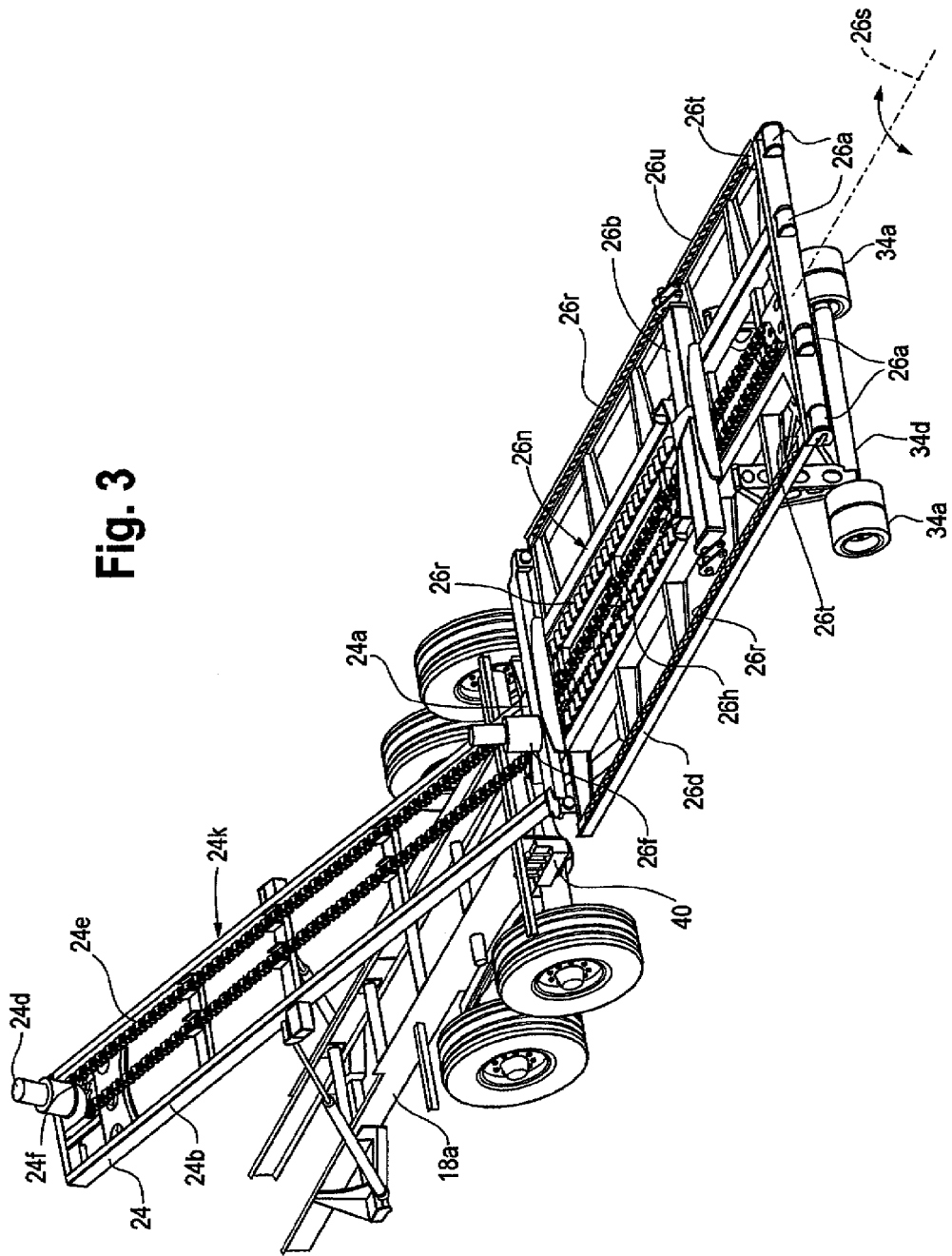
FIG. 3 is a perspective view of the tilt frame and transfer bed portions of the transferring system of FIGS. 1 and 2.
Figure 4:
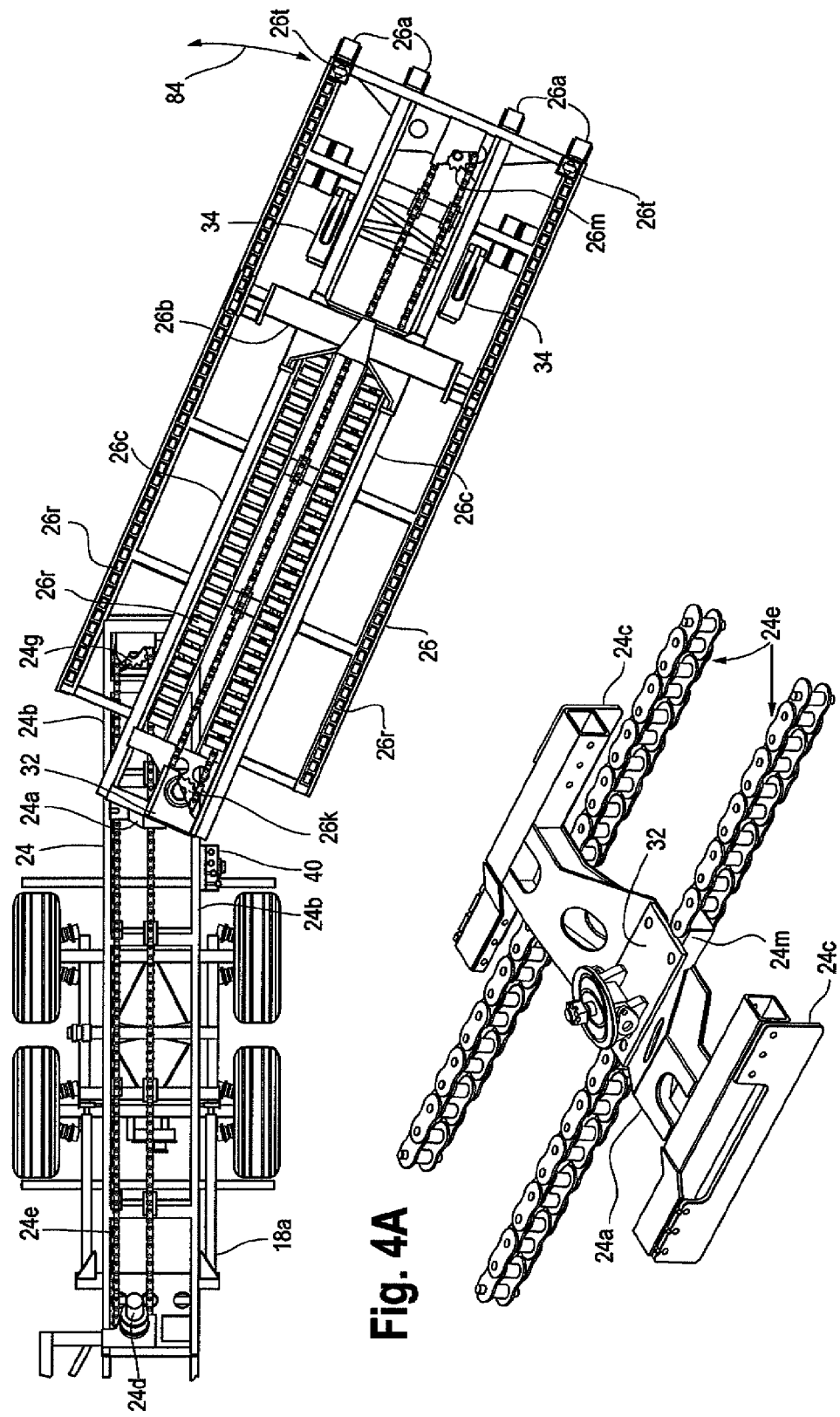
FIG. 4 is a top view of the transferring system illustrating the lateral flexibility associated with the use of a tilt frame trolley having a meshing wheel (partially hidden) which connects to the transfer bed.
Figure 5:
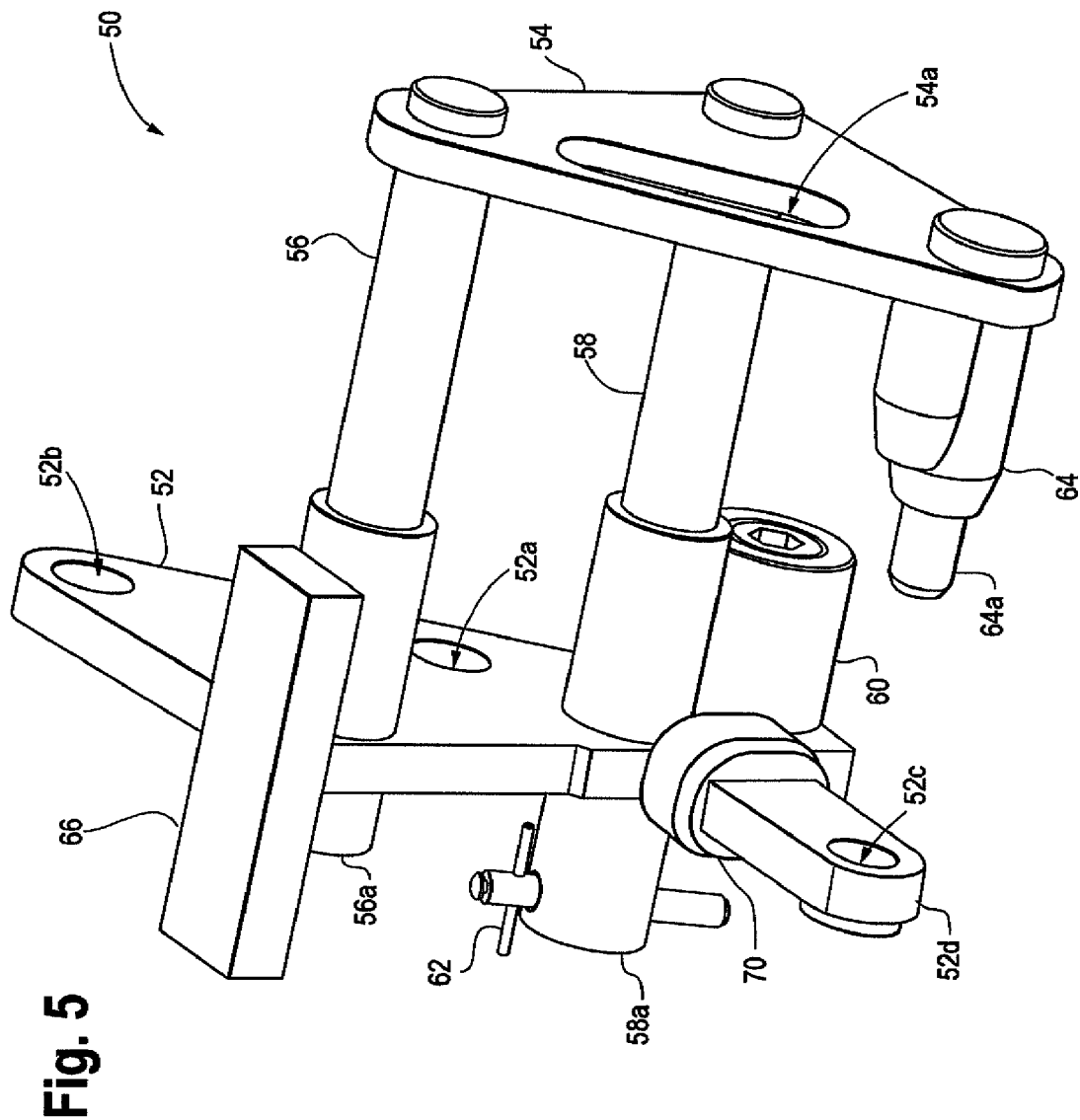
FIG. 5 is a perspective view of a preferred Rapid Attach™ container interface (RACI) device of the transferring system of the present invention.

In brief, cargo 28 (FIG. 1) may be loaded onto vehicle chassis 18a from any location using the retractable deck combination formed by tilt frame 24 and transfer bed 26. Cargo 28, which may take the form of a shipping container 28a (FIG. 2), may be engaged using a Rapid Attach™ A container interface (RACI) mechanism 50 (FIG. 5). RACI 50 and cargo 28a may be pulled onto transfer bed 26 via straps 70 (FIGS. 8-10) and transfer bed trolley 26b (FIG. 3). Transfer bed 26, with cargo 28a, may be pulled onto tilt frame 24 using meshing wheel 32 (FIGS. 4, 11-13B) that pivotally attaches transfer bed 26 to tilt frame 24. Meshing wheel 32 may be mounted on tilt frame trolley 24a (FIGS. 2 and 4) and secured to a forward portion of transfer bed 26 (as shown in FIG. 4). Tilt frame trolley 24a and meshing wheel 32 may then travel forward and/or upward on an upper surface 24k (FIG. 3) of tilt frame 24 until cargo container 2k rests on vehicle chassis 18a. Cargo 28 may also be transferred between vehicle 18 and aircraft loading ramp 10b (FIG. 2) using the retractable deck combination formed by tilt frame 24 and transfer bed 26, where transfer bed 26 is adjustable to the height of loading ramp 10b.

Provided below is a more detailed description of the cargo transfer system, including subsections providing more detailed descriptions of RACI 50, meshing wheel 32, and various methods of operating the cargo transfer system. This description and the references to "preferred" and "new" devices and steps are intended to provide context and information associated with the cargo transfer system, without limiting the claims which are set forth separately after this detailed description.

Cargo Transfer System

Figure 1:
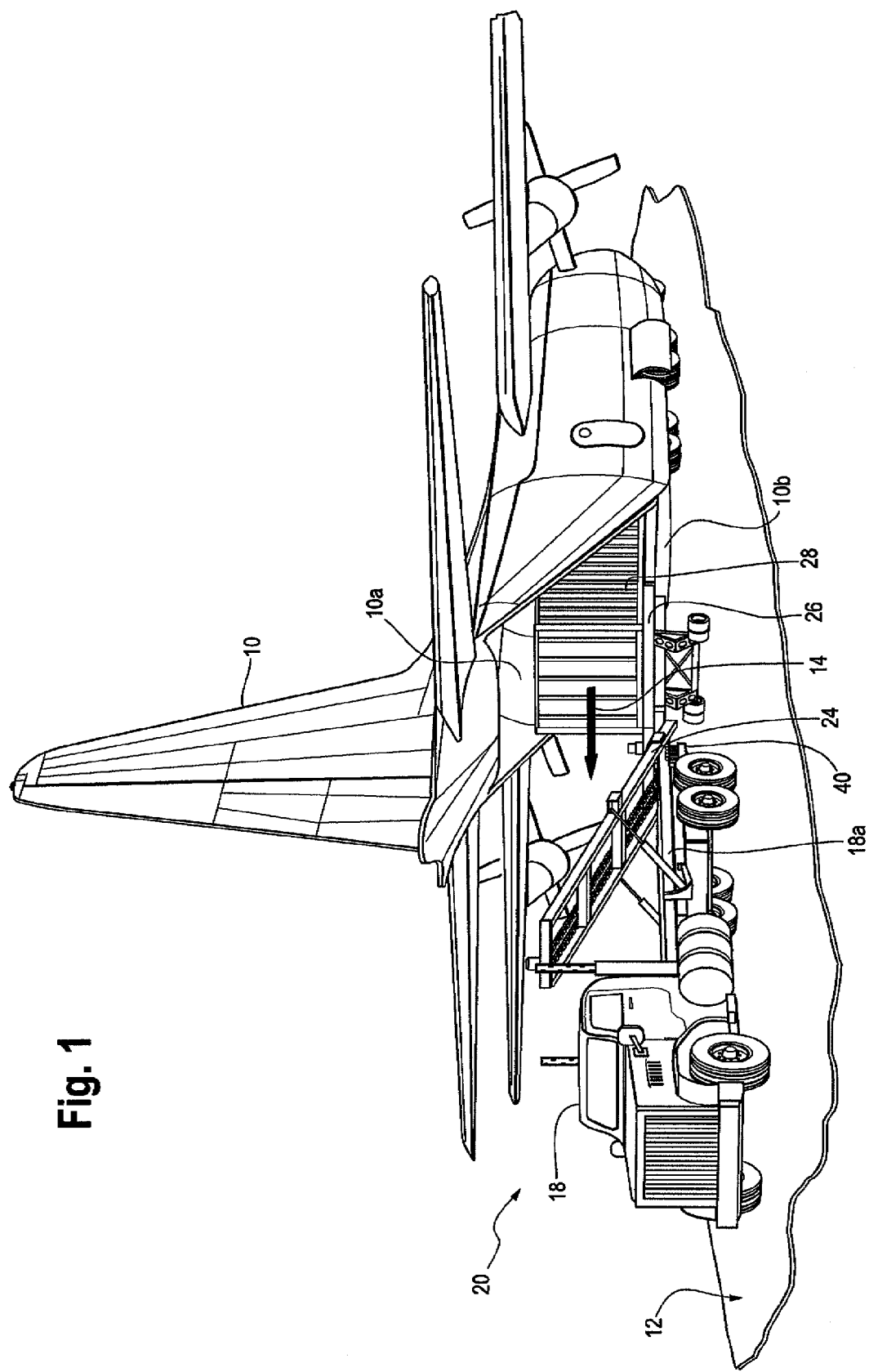
FIG. 1 is a perspective view of an aircraft having an aft-loading ramp, and a preferred embodiment of the transferring system of the present invention.
Figure 2:
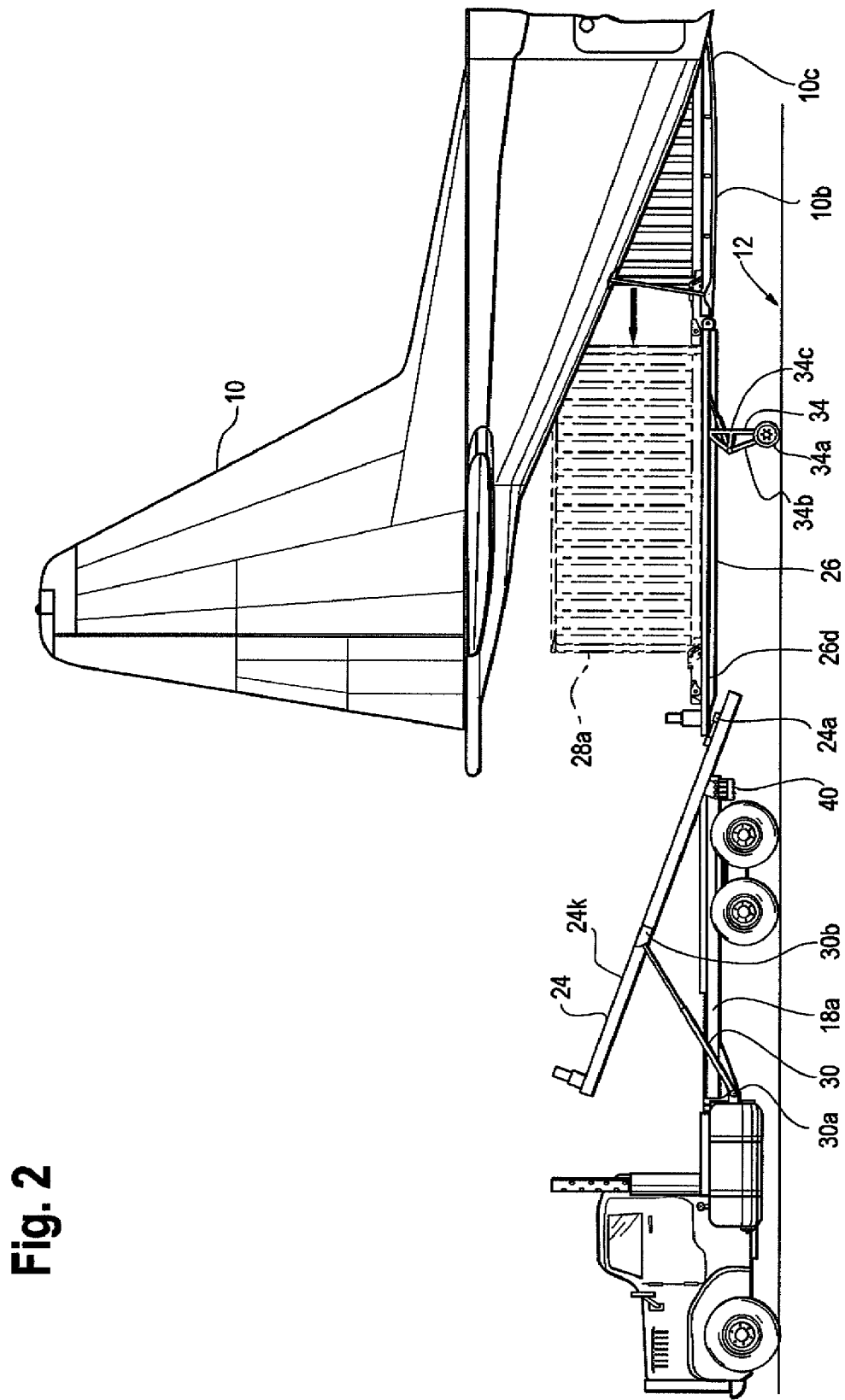
FIG. 2 is a side view of the transferring system and the aft-loading aircraft of FIG. 1, including the tilt frame and transfer bed portions of the transferring system.

Referring initially to FIGS. 1 and 2, an aircraft 10 and portions of transferring system 20 are shown. FIG. 1 shows an aircraft 10 having a loading ramp 10b, in this case an aft-loading ramp, vehicle 18, and portions of the transferring system 20, including tilt frame 24 and transfer bed 26. In FIG. 1, cargo 28 is shown moving in the direction indicated by arrow 14 from the cargo bay 10a of aircraft 10 to transfer bed 26.

FIG. 2 shows a side view of aircraft 10 on the ground 12 and shows tilt frame 24 and transfer bed 26 in a typical configuration for the transfer of cargo 28 between aircraft 10 and vehicle chassis 18a. In some embodiments, transferring system 20 includes vehicle chassis 18a, tilt frame 24, and transfer bed 26. In additional embodiments, transferring system 20 includes methods for transferring cargo 28 from aircraft 10, to transfer bed 26, and then onto vehicle classis 18a.

Referring to FIG. 2, loading ramp 10b is hinged to aircraft 10 at hinge point 10c. Loading ramp 10b may be used to access cargo bay 10a of aircraft 10. The floor (not shown) of cargo bay 10a may be approximately 32 inches above ground 12 in the case of a C-130 aircraft, and approximately 62 inches above ground 12 in the case of a C-17 aircraft, so it is preferable to provide a loading device which can accommodate a loading ramp having heights of at least this variance. Cargo bay 10a may include "roll on/roll off" rollers (not shown but known to those having ordinary skill in the art) for efficient handling of cargo pallets. Loading ramp 10b may be hydraulically operated and may also include features for efficiently transferring cargo, such as the "roll on/roll off" rollers.

The distance between loading ramp 10b and the top of cargo bay 10a presents spatial impediments to the efficient loading and unloading of aircraft 10. In addition, the distance between ground 12 and the tail portion of aircraft 10 presents spatial impediments to the efficient loading and unloading of aircraft 10. For example, in the case of a C-130 aircraft, unloading equipment with a winch and hook is problematic because there is only about 102 inches of usable distance between the end of ramp 10b and the top of aircraft bay 10a when ramp 10b is level with the floor of cargo bay 10a (allowing 6 inches of clearance at the top of the bay 10a). Also, in the case of a C-130 aircraft, the usable width of the bay is approximately 105 inches (allowing 6 inches on each side and allowing for the permanently installed rail system (not shown) in the bay 10b). In the case of a C-17 aircraft, there is only about 142 inches of usable distance between the end of ramp 10b and the top of aircraft bay 10a when ramp 10b is level with the floor of cargo bay 10a (allowing 6 inches of ceiling clearance). Also, in the case of a C-17 aircraft, the usable width of the bay is approximately 196 inches (allowing 6 inches of wall clearance). Although the dimensional impediments are described herein in regard to aircraft 10, similar dimensional impediments exist in regard to transporting cargo to and from other transporting crafts, such as, but not limited to, other aircraft, ships, and trucks.

Ideally, cargo 28 may be transferred between aircraft 10 and vehicle chassis 18a where neither the cargo nor the transferring system exceed a spatial envelope defined by: (a) a ceiling at the height of the transom above ramp 10b; (b) a width slightly less than the width of ramp 10b, for example, in the case of a C-130, a width of 105 inches which is slightly less than the width of the ramp on a C-130, with the width co-centered with ramp 10b; and (c) a length sufficient to allow clearance, and a margin for error, to prevent cargo 28 and equipment for transferring the cargo, from striking aircraft 10. For example, in the case of a C-130, the length sufficient to allow clearance is 30 feet from hinge point 10c to the rear of aircraft 10. Ideally, both cargo 28 and the equipment used to transfer cargo 28 remain within the spatial envelope as cargo 28 is transferred between aircraft 10 and vehicle chassis 18a.

Transferring system 20 may be used to efficiently load and unload cargo 28 to and from aircraft 10 and other cargo transports while remaining within the spatial envelope. Vehicle chassis 18a may be a variety of vehicle chassis, such as virtually any Class 7 or Class 8 truck chassis, such as but not limited to the Family of Medium Tactical Vehicle (FMTV) chassis. Vehicle chassis 18a may be mounted on any vehicle 18 capable of sustaining the weight of cargo 28 and transferring system 20.

As shown in FIG. 2, tilt frame 24 may be attached at a generally forward portion to chassis 18a via cylinder 30 between attachment point 30a and attachment point 30b. Cylinder 30 may raise and lower tilt frame 24 such that tilt frame 24 pivots near the back of vehicle chassis 18a. In addition to using a cylinder 30, tilt frame 24 may be attached to vehicle chassis 18a in a variety of manners, such as but not limited to, those described in U.S. Pat. Nos.: 5,779,431; 6,817,825; and 6,520,736, which are each fully incorporated herein by reference.

Tilt frame 24 may be attached to transfer bed 26 in a manner that allows the generally forward portion of transfer bed 26 to travel along the upper surface 24k of tilt frame 24. One manner of allowing such travel is by using a tilt frame trolley 24a and an associated meshing wheel 32 (FIG. 11) as described in greater detail below with regard to FIGS. 4 and 11-15.

Again referring to FIG. 2, transfer bed 26 may include adjustable carriage 34. Adjustable carriage 34 may include rear wheels 34a, support struts 34b, and support posts 34c. The height of adjustable carriage 34 may be adjusted through a number of adjustable mechanisms, such as but not limited to, a hydraulic mechanism that changes the distance between the upper surface 26n (see FIG. 3) of transfer bed 26 and rear wheels 34a. The adjustable mechanism permits cargo 28 transfer to/from several different heights of loading platforms, not limited to various aircraft loading ramps 10b. If desirable, the wheels 34a on different sides of the transfer bed 26 may act independently for the purpose of leveling the transfer bed 26 with ramps 10b about the roll axis 26s (see FIG. 3). For example, the independent adjustment mechanisms may be used to level the upper surface 26n with the ramp 26b on ground 12, even if the ground 12 is uneven.

Referring now to FIGS. 3 and 4, vehicle chassis 18a, tilt frame 24, and transfer bed 26 are shown. Tilt frame 24 allows transfer bed 26 and cargo 28 to be transferred to and from vehicle chassis 18a without exceeding the spatial envelope. Tilt frame 24 may include tilt frame trolley 24a (also see FIGS. 14-15) that may travel on tilt frame tracks 24b. Trolley 24a may be moved on tracks 24b using tilt frame motor 24d, chain 24e, first gear 24f, and second gear 24g. Meshing wheel 32 (also see FIGS. 11-15) may be secured to trolley 24a using conventional fasteners, such as bolts. Motor 24d provides a motive force which is communicated to trolley 24a via chain 24e, first gear 24f and second gear 24g. As trolley 24a travels on the upper surface 24k of tilt frame 24, the transfer bed 26, to which trolley 24a is secured, moves onto, or off of, tilt frame 24.

Transfer bed 26 allows cargo 28 to be transferred to and from aircraft 10 without exceeding the spatial envelope, and allows for cargo 28 to be transferred at the same level as loading ramp 10b. Transfer bed 26 may include transfer bed trolley 26b that may travel on transfer bed tracks 26c. Trolley 26b may be moved on tracks 26c using transfer bed motor 26f, chain 26h, third gear 26k, and fourth gear 26m. Motor 26f provides a motive force which is communicated to trolley 26b via chain 26h, third gear 26k, and fourth gear 26m. When loaded, movement of trolley 26b towards tilt frame 24 results in movement of cargo 28 toward tilt frame 24. Transfer bed end rollers 26a allow for the smooth transition of cargo between ground 12 and transfer bed 26. Transfer bed 26 may also include imbedded retractable "roll on/roll off" rollers 26r for moving cargo 28 on the upper surface 26n of transfer bed 26. Transfer bed imbedded rollers 26r may also allow for the smooth transition of cargo between ramp 10b and transfer bed 26. Transfer bed 26 may also include screw-down twist or tandem locks 26t, as shown in FIG. 3, to interface with an ISO corner fitting, for securing cargo 28 to the transfer bed 26.

In FIG. 3, it can be seen that adjustable carriage 34 may have a rear wheel 34a on each end of axle 34d. Although shown extended in FIGS. 2 and 3, adjustable carriage may also be retracted under transfer bed 26 when cargo 28 is being moved from ground 12 to transfer bed 26 (see FIG. 10).

Control panel 40 may provide controls for operating tilt frame motor 24*d*, transfer bed motor 26*f*, and adjustable carriage 34. A remote wireless control (not shown) may also be used to operate the transferring system 20.

Rapid Attach Device

FIGS. 5-10 show a preferred mechanism, Rapid Attach™ container interface (RACI) 50, for quickly connecting and disconnecting cargo 28 to the rear of transfer bed 26 so that cargo 28 may be moved, for example from ground 12 to transfer bed 26. In short, RACI 50 enables corner fittings 28*b* (FIG. 6A) of shipping container 28*a*, or other cargo 28, to be quickly attached to transfer bed 26. Corner fittings 28*b* may be as specified by the American National Standards Institute/International Organization for Standardization (ANSI/ISO). Such fittings are available from suppliers such as Tandemloc, Inc., of Havelock, N.C., and are known to those having ordinary skill in the art.

RACI 50 may include a bracket 72 (FIG. 8) that provides an attachment point for the use of straps 70 to load container 28*a* onto transfer bed 26. Straps 70 may be made of nylon (e.g., 3-ply or 4-ply) or another strong, yet flexible, material. Due to its design and construction, it has been found that RACI 50 may be attached and locked to the shipping container in less than ten seconds, and each mechanism of a pair may weigh only about 35-40 pounds.

FIG. 5 shows RACI 50 in an open position. RACI 50 may include first plate 52, second plate 54, first bar 56, first sleeve 56*a*, second bar 58, second sleeve 58*a*, RACI wheel 60, first pin 62, second pin 64, brace 66 and fitting insert 70. Fitting insert 70 and second pin 64 are designed to conform to the generally oval apertures of corner fitting 28*b* (see FIGS. 6A and 6B).

First plate 52 may include several apertures, including first aperture 52*a*, bracket aperture 52*b*, an aperture in which first sleeve 56 may be affixed, an aperture in which second sleeve 58 may be affixed, an aperture configured for supporting RACI wheel 60, and a pin aperture 52*c*. Pin aperture 52*c* is located on an insert portion 52*d* of plate 52. Pin aperture 52*c* is configured to accept second pin 64 when RACI 50 is closed.

First plate 52 may be constructed from a variety of materials, such as but not limited to, high tensile steel such as ASTM A514B. First plate 52 may be machined to include the features described herein. Flat plates may be laser cut, while pins are cast or stock materials. First plate 52 may be constructed from materials, and constructed in a manner, to provide sufficient structure integrity to perform the operations described herein.

Second plate 54 may include carrying aperture 54*a*, an aperture in which first bar 56 may be affixed, an aperture in which second bar 58 may be affixed, and an aperture in which second pin 64 may be affixed. Second plate 54 may be constructed from similar materials, and in a similar manner, as described above in regard to first plate 52.

First bar 56 may be attached to second plate 54 on a first end, while the second end is configured to adjustably slide within and/or through first sleeve 56*a* and first plate 54. Bar 56 may be formed from stock round materials, such as but not limited to ASTM A 108, C-1045 cold-drawn bar, milled to shape as shown and described herein, and provided with a chamfered machined end. Of course, for mass production purposes, tooling and steel casting of parts may be done. First bar 56 may inserted through an aperture in second plate 54, and welded in place, for example.

Using similar principles, second bar 58 may be attached to second plate 54 on a first end, while the second end is configured to adjustably slide within and/or through second sleeve 58*a* and first plate 54. Second bar 58 may include a plurality of apertures configured to accept first pin 62. Second bar 58 may be constructed from similar materials, and in a similar manner, as described above in regard to first bar 56. Second bar 58 may also be attached to second plate 54 in a manner similar to that described above for first bar 56.

First pin 62 may pass through second sleeve 58*a* and the plurality of apertures of second bar 58. First pin 62 may be configured to provide a secure fit in order to maximize the structural integrity of RACI 50 when RACI is subject to the stresses associated with the operation of RACI 50 as described below.

Brace 66, which may be cold drawn, may be configured to lie flush against shipping container 28*a* during the operation of RACI 50, as described below, in order to provide lateral stability. Brace 66 may be attached to first plate 52 by welding, for example. Brace 66 may be used to keep RACI 50 from rotating vertically.

RACI wheel 60 (FIG. 5) may be configured, and attached to first plate 52, in a manner that provides sufficient mechanical integrity to support RACI 50, and cargo 28, in the operation of RACI 50 as described below. RACI wheel 60, which may be steamed and hardened bar stock, should be made so that the bolt head is counter-sunk and flush with the edge and recessed into the roller, so that it does not rub on the roller bed tracks 26*c* (FIG. 4) or other portions of the transfer system 20.

Second pin 64 is configured to allow an end portion to pass through a first aperture 28*c* (FIG. 6A) on corner fitting 28*b* when RACI 50 is closed. Insert portion 52*d* is designed to pass through a second aperture 28*d* (FIG. 6B) on corner fitting 28*b* when RACI 50 is closed. When the RACI 50 is closed on a corner fitting 28*b*, second pin 64 mates with insert portion 52*d* of first plate 52 in the internal hollow portion of the corner fitting 28*h*.

One preferred method of operating RACI 50 is now described in reference to FIGS. 5-10. In one step, the RACI 50 is placed near corner fitting 28*b* of container 28*a*. RACI 50 is placed near corner fitting 28*b* in an open position, such as the open position shown in FIGS. 5, 6A and 6C. Insert portion 52*d* of first plate 52 is inserted into the second aperture 28*d* of corner fitting 28*b*, with RACI wheel 60 oriented toward ground 12, and second pin 64 in line with first aperture 2*k* of corner fitting 28*b*, as shown in FIGS. 6A and 6C.

In another step, RACI 50 is closed by applying a force on second plate 54 towards cargo 28, as shown by arrows 68 in FIGS. 6A and 6B, The force may be applied to second plate 54 through carrying aperture 54*a* and/or via the exterior surface of second plate 54. The force applied to second plate 54 results in first bar 56 and second bar 58 passing, respectively, through first sleeve 56*a* and second sleeve 58*a*, and results in second plate 54 moving towards first plate 52. The force is applied until an end portion 64*a* of second pin 64 enters first aperture 28*c* of corner fitting 28*b* and mates in aperture 52*c*.

Figure 7B:
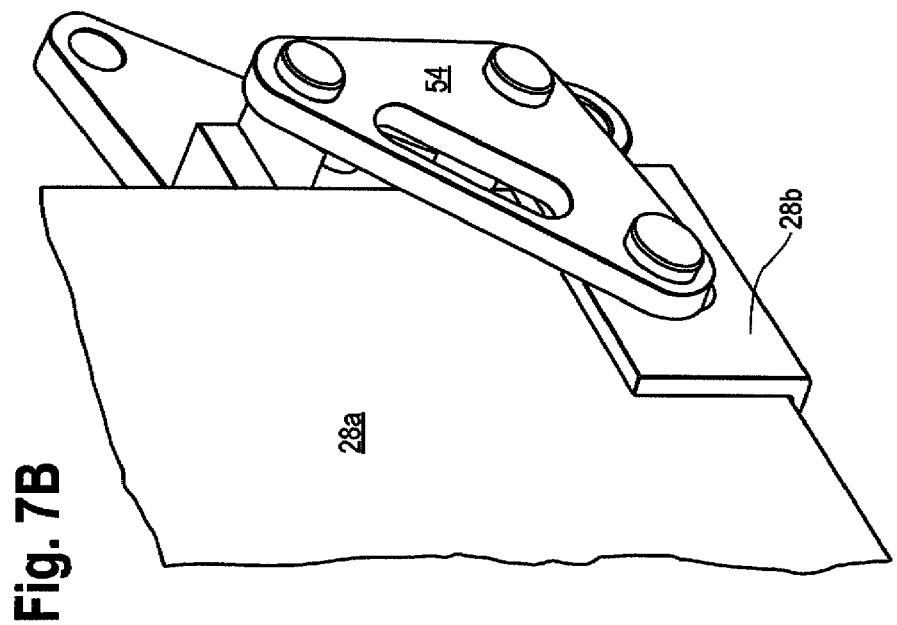
FIG. 7B is a fourth perspective view of the RACI of FIG. 5 showing the closed RACI over the corner fitting of the shipping container.
Figure 7A:
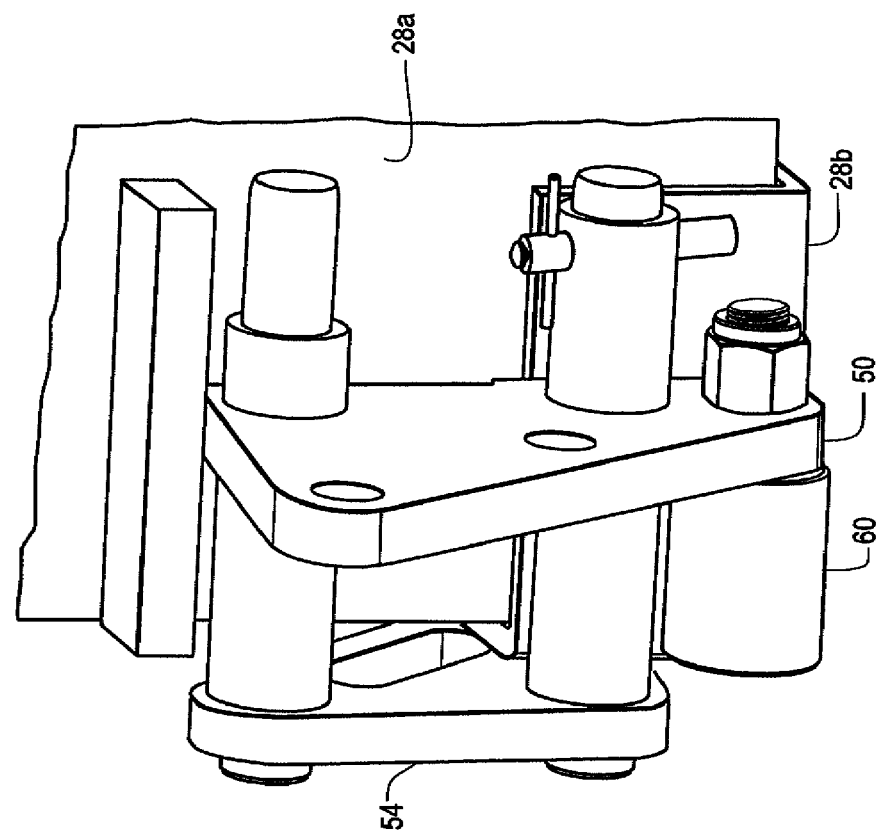
FIG. 7A is a third perspective view of the RACI of FIG. 5 showing the closed RACI over the corner fitting of the shipping container.
Figure 10:
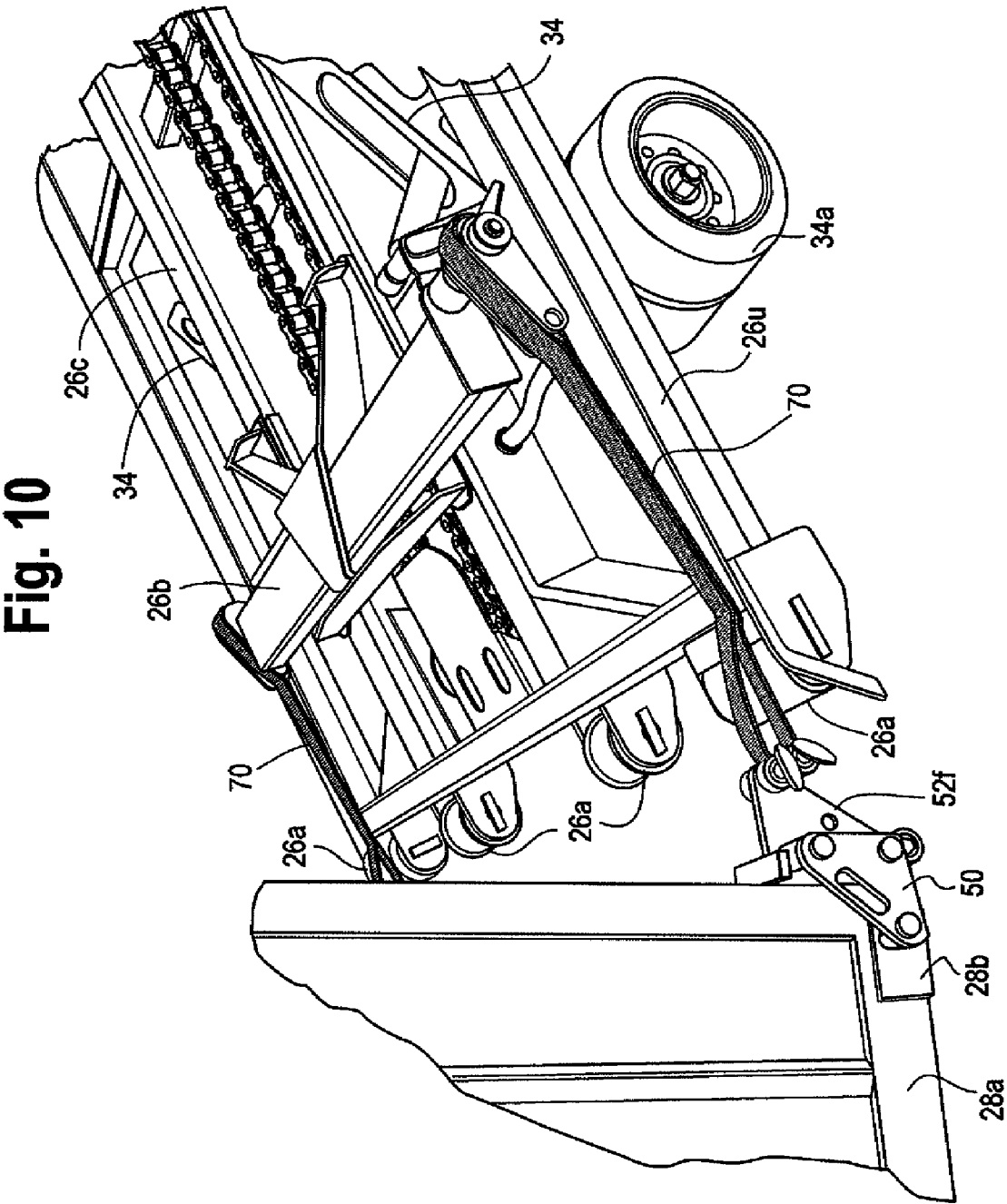
FIG. 10 is a second perspective view of the RACI of FIG. 5, shown during the loading of the shipping container onto the transfer bed of FIGS. 1-4.
Figure 11:
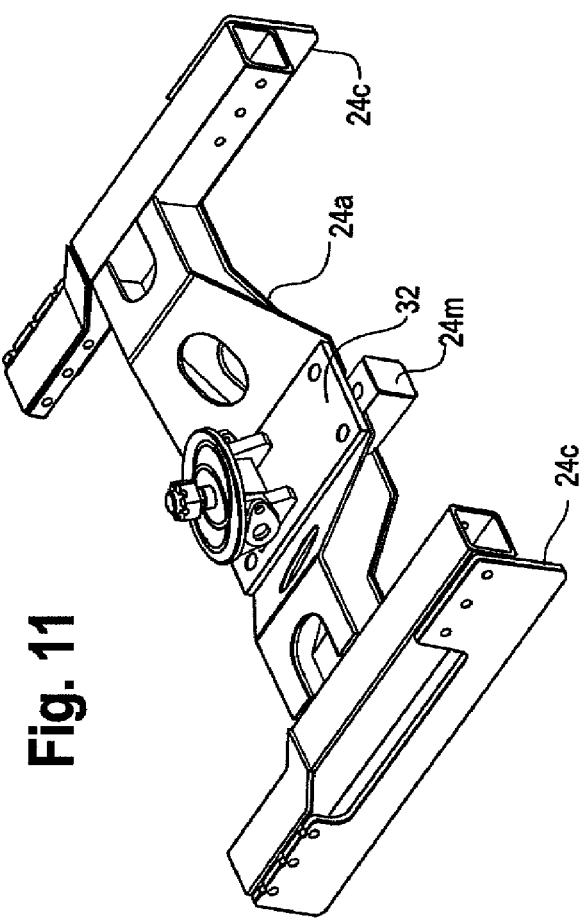
FIG. 11 is a top perspective view of the meshing wheel of FIG. 4.

In another step, RACI 50 is locked in place. RACI 50 may be locked by placing first pin 62 through second sleeve 58*a* and one of the plurality of apertures (not shown) of second bar 58 as shown in FIG. 7A. FIGS. 7A and 7B show RACI 50 in a closed and locked position.

In another step, bracket 72 is attached to RACI 50 through bracket aperture 52*b* as shown in FIG. 8. In another step, strap 70 is attached to transfer bed trolley 26*b* (FIGS. 3 and 4) and bracket 72. In another step, cargo container 28*b* is moved when transfer bed trolley 26*b* pulls on strap 70, resulting in a force being applied to bracket 72, and then to RACI 50, resulting in a force being applied to container cargo 28*b*.

In another step, cargo container is pulled onto the upper surface 26*n* of transfer bed 26. As shown in FIGS. 6C and 8, first plate 52 may include a sloped surface 52*f* to allow RACI 50 to easily pass to upper surface 26n after passing over rollers 26a. As a pulling force is applied to strap 70, sloped surface 52f comes in contact with rollers 26a of transfer bed 26. Further pulling on straps 70 results in RACI 50 traveling over roller 26a and onto the upper surface 26n of transfer bed 26.

Meshing Wheel Device

FIGS. 11-15 show a preferred mechanism, a meshing wheel 32 and tilt frame trolley 24a, for pivotally connecting transfer bed 26 to tilt frame 24, and moving transfer bed 26 in relationship to tilt frame 24. Trolley 24a and meshing wheel 32 enable transfer bed 26 to be lowered from tilt frame 24 in a flexible manner that allows for the efficient loading of cargo 28 onto transfer bed 26 and chassis 18a, whether cargo 28 is on the ground 12 or on loading ramp 10b.

Referring now to FIGS. 11 through 13B, meshing wheel 32 may include mounting plate 32a, mounting apertures 32b, mounting risers 32c, arcing table 32d, table supports 32e, pin 32f, pin nut 32g, securing plates 32h, and grease fittings 32m. Mounting plate 32a and apertures 32b may be used to secure meshing wheel 32 to tilt frame trolley 24a (FIG. 12) using conventional fastening methods, such as but not limited to nuts and bolts. For example, meshing wheel 32 may be mounted on trolley 24a in a variety of ways such as, but not limited to, placing four (4) bolts, for example grade eight (8) bolts, through mounting apertures 32b and trolley 24a, and securing the bolts with compatible nuts.

Mounting risers 32c and table supports 32e may be interlaced (shown in FIGS. 11 and 13A) and pivotally affixed with securing plates 32h, in order to create a rocking axle shown by dashed line 80 (FIG. 12), allowing in-line movement of arcing table 32d (as shown by arrow 82) in relation to mounting plate 32a. Pin 32f and pin nut 32g may be used to secure meshing wheel 32 to transfer bed 26 (FIG. 13B). Thus, transfer bed 26 may be mounted on tilt frame trolley 24a by passing pin 32f through transfer bed 26 and placing pin nut 32g on pin 32f.

Arcing table 32d includes meshing surface 32k. Transfer bed includes meshing surface 26q (FIG. 13A). Meshing surfaces 32k and 26q allow the transfer bed 26 to move laterally, as shown by arrow 84 in FIG. 4, in conjunction with the inline movement permitted by rocking axle 80. Grease fittings 32m allow grease to be placed between the meshing surfaces 32k and 26q.

Figure 12:
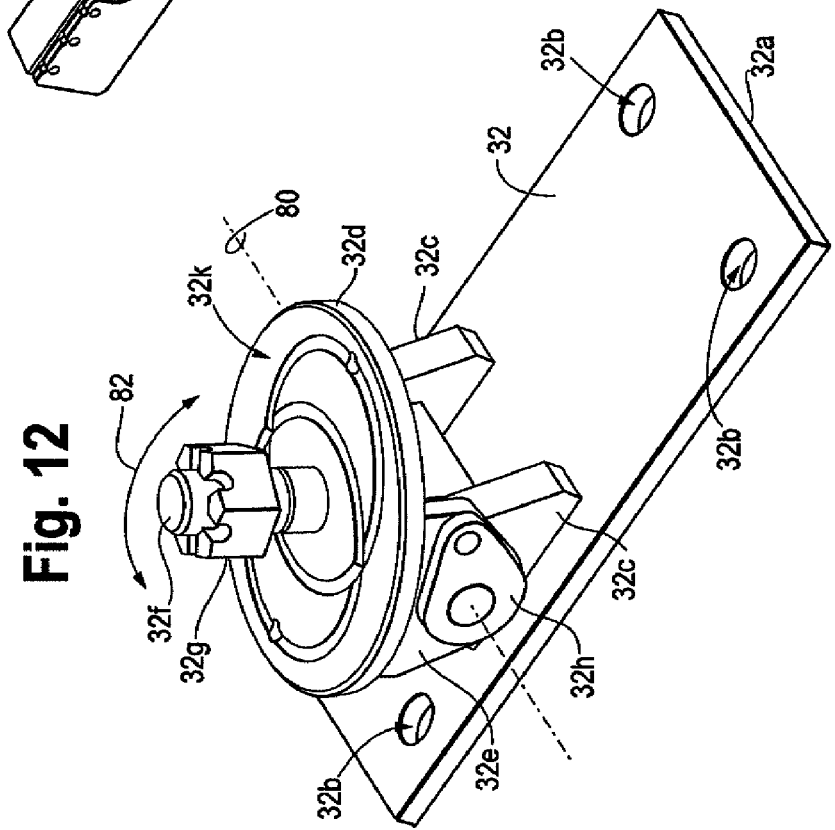
FIG. 12 is a top perspective view of the meshing wheel on the trolley of FIG. 4.

Referring to FIG. 12, tilt frame trolley 24a may include side plates 24c. Side plates 24c may be configured to follow tilt frame trolley tracks 24b (FIG. 3). Tilt frame trolley 24a is also connected to chain 24e (FIG. 3) using a master link or any convenient method for affixing the chain 24e to the tilt frame trolley 24a in a manner that allows tilt frame trolley 24a to be moved along tracks 24b using motor 24d (FIGS. 3 and 4). Thus, a first end 26d of transfer bed 26 may be moved on tracks 24h between the ends of tilt frame 24 using motor 24d.

The transfer system 20 may also include a quick detach system for rapidly disengaging the transfer bed 26 from the vehicle chassis 18a, such as by using a quick-disconnect, pull-pin (not shown).

The arrangement described herein allows transfer bed 26 to pivot in at least two manners. The first manner in which transfer bed 26 may pivot is inline with chassis 18a as arcing table 32d pivots in line with chassis 18a and mounting plate 32a as transfer bed 26 is raised or lowered on the upper surface 24k of tilting frame 24, i.e., transfer bed 26 may pivot upon the rocking axle shown by dashed line 80 (FIG. 12). The second manner in which transfer bed 26 may pivot is that transfer bed 26 may pivot in the lateral directions indicated by arrow 84 in FIG. 4, i.e., transfer bed 26 may pivot upon an axis defined by pin 86.

FIGS. 14 and 15 show the movement of tilt frame trolley 24a on tilt frame 24. In FIG. 14, trolley 24a is located near a distal end (from the cab of vehicle 18) of tilt frame 24. In FIG. 15, trolley is located closer to the cab of vehicle 18. Trolley 24a moves from the position shown in FIG. 14 to, and from, the position shown in FIG. 15, through the movement of chain 24e about first gear 24f (FIG. 3) and second gear 24g (FIGS. 4, 14 and 15). As chain 24e moves, trolley 24a moves along tracks 24b.

Pintle Device

FIGS. 16A and 16B show a preferred mechanism, a pintle device 90, for towing a trailer. Pintle device 90 may be retractable as shown by arrow 98. Pintle device 90 may be retractable, at least in part, to minimize interference while transfer bed 26 is being lowered from tilt frame 24 and while transfer bed 26 is positioned for transferring cargo 28, such as shown in FIG. 18A.

Pintle device 90 may include loop 92, plate 94, and hinged support 96. Hinged support 96 allows pintle device 90 to be folded into transfer bed 26 such that hinged support 96 is flush with the bottom surface of transfer bed 26, and held in place with a removable pin. It may also be convenient to locate the pintle hook 90 so that it is integrated into the rear stabilizers, and so that it is both retractable and telescoping.

System Operation

Referring now to FIGS. 17A, 17B, and 17C, one preferred method of practicing the invention is described hi sequential views. FIG. 17A shows cargo 28 on transfer bed 26. In FIG. 17A, transfer bed 26 is horizontal. as it might be after receiving cargo 28 from loading ramp 10b (FIGS. 1 and 2) where transfer bed 26 is level with loading ramp 10b. FIG. 17B shows transfer bed 26 with cargo 28 being moved from a position level with loading ramp 10b to a position on tilt frame 24 and chassis 18a. FIG. 17C shows cargo 28, transfer bed, and tilt frame 24 on chassis 18a.

In operation, vehicle 18 (FIG. 1), equipped with transferring system 20, may approach the rear of aircraft 10. Loading ramp 10b may be lowered to access cargo 28 in cargo bay 10a (FIG. 2). Vehicle 18 may stop at a distance from loading ramp 10b such that space is allowed for transfer bed 26 to extend between tilt frame 24 and loading ramp 10b.

Cargo 28 may be moved onto transfer bed 26 in a number of manners. In the case where cargo 28 is a vehicle, the vehicle may be driven on to transfer bed 26. In the case where cargo is a container 28a, container 28a may be pushed on imbedded rollers, including transfer bed imbedded rollers 26r, from cargo bay 10a to the upper surface 26n of transfer bed 26. Containers 28a may also be moved using RACI 50 and transfer bed trolley 26b. In FIG. 17A, cargo 28 is shown secured using RACI 50 attached to trolley 26b. Cargo may also be secured using ISO corner fitting twist locks 26t (FIG. 3). Motor 26g may used to pull cargo 28 through trolley 26b, strap 70, and RACI 50. In FIG. 17A, tilt frame trolley 24a is shown at the distal end of tilt frame 24, while cylinder 30 is extended causing tilt frame 24 to pivot on chassis 18a.

FIG. 17B shows transfer bed 26 and cargo 28 being pulled onto tilt frame 24. As tilt frame motor 24d pulls tilt frame trolley 24a toward the proximate end of tilt frame 24, meshing wheel 32 pivots, in-line and laterally as required by the circumstances, in order to align transfer bed 26 with tilt frame 24. As transfer bed 26 moves toward the proximate end of tilt frame 24, adjustable carriage 34 adjusts and eventually retracts as shown in FIG. 17C.

FIG. 17C shows tilt frame 24 and transfer bed 26 lying horizontally on chassis 18a. Adjustable carriage 34 has collapsed such that rear wheels 34a are raised in order to avoid interference with the movement of vehicle 18. Cylinder 30 has also retracted as tilt frame 24 moved from the pivoted position shown in FIG. 17B to the horizontal position shown in FIG. 17C.

In one preferred embodiment, the invention provides a device for transporting cargo 28 between an aircraft 10 and a land-based vehicle 18 having a vehicle chassis 18a. The invention may include a pivoting tilt frame 24 supported by vehicle chassis 18a and transfer bed 26. Transfer bed 26 is pivotally connected at a first end 26d, to the tilt frame 24 and has a second, or distal, end in engaged communication with loading ramp 10b of aircraft 10. This permits cargo 28 from aircraft 10 to be received by the transfer bed 26, and also permits cargo 28 to be transported from transfer bed 26 into the loading compartment of aircraft 10. in the preferred embodiment shown, the transfer bed 26 has an upper surface 26n on which cargo 28 rests, and the upper surface 26n of transfer bed 26 is capable of selective height adjustment relative to the ground 12. Selective height adjustment may be provided by adjustable carriage 34, as described above.

Referring now to FIGS. 18A, 18B, 18C and 18D, another preferred method of practicing the invention is described in sequential views. FIG. 18A shows cargo 28 on the ground 12 to the rear of the transfer system 20 with the RACI 50 attached to the cargo 28. In FIG. 18A, transfer bed 26 is angled as it might in anticipation of receiving cargo 28 located on the ground 12. FIG. 18B shows cargo 28 being moved onto the transfer bed 26. FIG. 18C shows the cargo 28 partially on the transfer bed 26. FIG. 18D shows the cargo 28 on the transfer bed 26.

It should by now be appreciated that various alternative mechanisms and/or modifications to the above-referenced designs may be made while still keeping within the principles of the various inventions described here, examples of which will now be discussed. Durable, flip-away guide rollers (not shown) may be used to facilitate guiding the load onto the cargo bed. Lanyards (small metal cables) may be used on pins to retain the pins. Storage boxes may be added as needed. Because the loading device may be used in exigent circumstances, it may be desirable to tilt frame 24 and/or transfer bed 26 so that they may be quickly jettisoned if necessary, such as by employing quick-detach pins and/or quick-disconnect hoses. Chains, such as chain 24e and chain 26h, may be provided with a self-cleaning wiper system (not shown). A perforated deck may be employed to limit weight. Lighting may be incorporated into the bed, using protective pockets for example. One or more sets of controls may be located not just in the vehicle cab but also, for example, just behind the tilt pivot point, on each side of the unit (preferably integrated into the bed and protected).

The above description is not intended to limit the meaning of the words used in the following claims that define the invention. Other systems, methods, features, and advantages of the present invention will be, or will become, apparent to one having ordinary skill in the art upon examination of the foregoing drawings, written description and claims, and persons of ordinary skill in the art will understand that a variety of other designs still falling within the scope of the following claims may be envisioned and used. For example, RACI 50 may be linked together by a brace, bar, rope or any other means, so that the linked pairs may be secured to two corner fittings 28b. It is contemplated that these or other future modifications in structure, function or result will exist that are not substantial changes and that all such insubstantial changes in what is claimed are intended to be covered by the claims.

We claim:

1. A method of transferring cargo between a vehicle having a chassis and a cab, and a loading ramp of varying height capable of receiving and dispatching cargo, the method comprising the steps of:
    providing a loading and unloading device having: a tilt frame pivotally engaged to the vehicle chassis, the tilt frame including a first end located near the cab of the vehicle chassis and capable of being raised away from the vehicle chassis, and a second end distal from the cab; and a transfer bed capable of adjusting to varying heights, the transfer bed including a first end adjacent to the tilt frame and a second end adjacent to the loading ramp, wherein the tilt frame includes means for facilitating movement of the transfer bed along the tilt frame;
    leveling the transfer bed at varying heights without changing the height of the vehicle chassis by varying both of: the height of the first end of the transfer bed by moving it along an upper surface of the tilt frame; and the height of a carriage configured to support the second end of the transfer bed;
    loading the cargo from the loading ramp onto the second end of the transfer bed;
    pulling the transfer bed onto the tilt frame using the means for facilitating movement of the transfer bed along the tilt frame; and
    lowering the tilt frame.

2. The method of claim 1, wherein the cargo loaded onto the transfer bed comes from an aft-loaded aircraft having a confining spatial envelope defined by a rear end of the aircraft, and wherein practicing the method does not require movement outside the spatial envelope when the tilt frame is raised and the adjustable carriage supports the second end of the transfer bed which is in engaged communication with the loading ramp.

3. The method of claim 1, further comprising a trolley moveable along the tilt frame, and wherein the step of leveling the transfer bed includes moving the trolley from near the first end of the tilt frame to near the second end of the tilt frame.

4. The method of claim 1, wherein the transfer bed is connected to the tilt frame with a meshing wheel for permitting lateral and inline movement of the transfer bed in relation to the tilt frame.

5. The method of claim 1, further comprising the step of laterally moving the transfer bed in relation to the tilt frame.

6. The method of claim 1, further comprising a trolley moveable along the tilt frame, and wherein the step of loading the cargo onto the transfer bed includes moving the trolley from near the second end of the transfer bed to near the first end of the transfer bed.

7. The method of claim 1, wherein the carriage includes a plurality of wheels, and further including the step of adjusting the height of the carriage by independently adjusting the distance between the plurality of wheels and the transfer bed.

8. The method of claim 1, wherein the means for facilitating movement of the transfer bed along the tilt frame comprises a trolley movable along the tilt frame.

9. The method of claim 1, wherein the means for facilitating movement of the transfer bed along the tilt frame comprises a meshing wheel connecting the transfer bed to the tilt frame.

\* \* \* \* \*